United States Patent [19]

Amano et al.

[11] Patent Number: 5,210,158
[45] Date of Patent: May 11, 1993

[54] SUSPENSION POLYMERIZATION OF VINYL CHLORIDE WITH HEATING OF REACTOR SURFACES

[75] Inventors: Tadashi Amano, Kanagawa; Shigehiro Hoshida, Ibaraki; Yoshihiro Shirota, Gunma, all of Japan

[73] Assignee: Shin-Etsu Chemical Co., Ltd., Tokyo, Japan

[21] Appl. No.: 741,652

[22] Filed: Aug. 7, 1991

[30] Foreign Application Priority Data

Aug. 31, 1990 [JP] Japan .................................. 2-230404

[51] Int. Cl.$^5$ .............................................. C08F 2/20
[52] U.S. Cl. ..................................... 526/62; 526/200; 526/202
[58] Field of Search ................... 526/62, 72, 344.2

[56] References Cited

U.S. PATENT DOCUMENTS

| | | | |
|---|---|---|---|
| 3,004,013 | 10/1961 | Kircher | 526/344.2 |
| 4,224,424 | 9/1980 | Bauman | 526/62 |
| 4,659,791 | 4/1987 | Gardner | 526/62 |

Primary Examiner—Christopher Henderson
Attorney, Agent, or Firm—McAulay Fisher Nissen Goldberg & Kiel

[57] ABSTRACT

An improvement is proposed in the process of suspension polymerizatiopn of vinyl chloride monomer in an aqueous polymerization medium, by which a resin product of high quality relative to the contents of foamy resin and fish-eyes can be produced in a high efficiency with little deposition of polymer scale on the reactor walls. The improvment comprises heating and keeping the surfaces of the polymerization reactor and accessory equipment coming into contact with the gaseous phase above the polymerization mixture at a temperature of 55° C. or higher during a period starting from a moment when the temperature of the polymerization mixture under temperature elevation up to the polymerization temperature is still 45° C. or lower to a moment when conversion of the monomer into polymer is at least 10% so that foaming on the polymerization mixture can be greatly reduced.

2 Claims, 1 Drawing Sheet

FIGURE
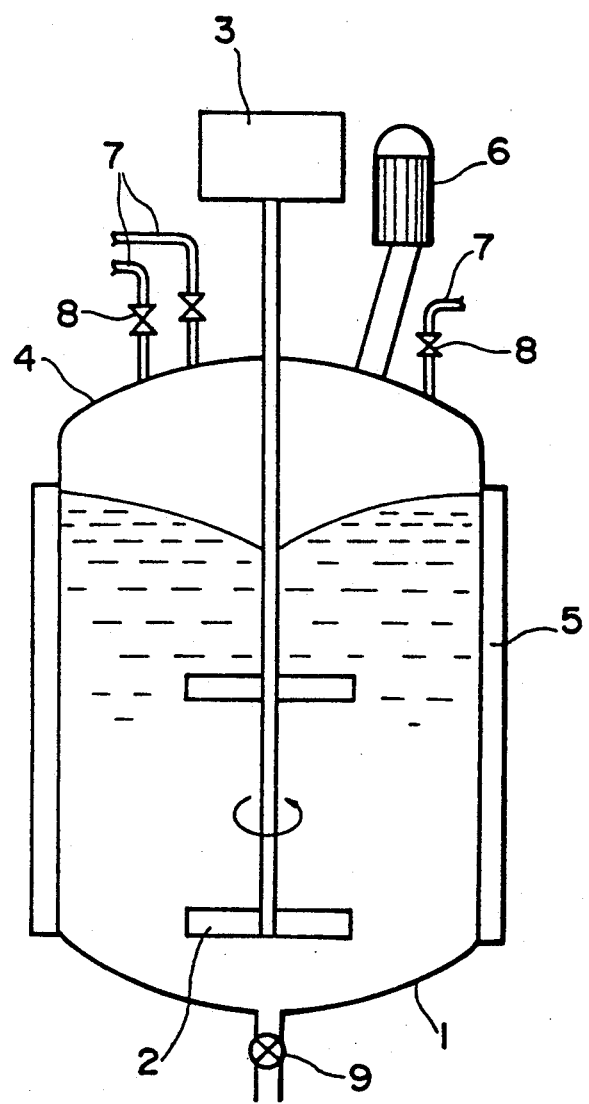

5,210,158

SUSPENSION POLYMERIZATION OF VINYL CHLORIDE WITH HEATING OF REACTOR SURFACES

BACKGROUND OF THE INVENTION

The present invention relates to an improvement in the suspension polymerization of vinyl chloride or, more particularly, to an improvement in the process of suspension polymerization of vinyl chloride or a monomer mixture mainly composed of vinyl chloride in an aqueous polymerization medium, by which a high-quality vinyl chloride-based polymeric resin can be produced in a high efficiency.

As is well known, vinyl chloride-based polymeric resins are mostly produced by the suspension polymerization of vinyl chloride or a monomer mixture mainly composed of vinyl chloride in an aqueous polymerization medium in a batch-wise process. Namely, the process is conducted by introducing deionized water as the polymerization medium, suspending agent and polymerization initiator into a jacketed polymerization reactor equipped with a stirrer and a reflux condenser and, after evacuation of the reactor to exclude the atmospheric oxygen, vinyl chloride monomer is introduced into the reactor and dispersed in the aqueous medium under agitation to form a polymerization mixture in the form of a suspension which is then heated up to a polymerization temperature of, usually, 50° to 60° C. where the polymerization reaction starts and proceeds.

One of the problems in the above described process is that, in the course of the temperature elevation up to the polymerization temperature, bubbles rise in the liquid phase of the polymerization mixture to form foams which cover and float on the liquid surface. These foams are hardly destroyable even by undertaking a mechaical or other foam-breaking means so that the polymerization reaction proceeds in the liquid medium covered with the foams to cause various disadvantages. For example, polymer scale is heavily deposited on the inner walls of the polymerization reactor, especially, in the areas just above the interface between the liquid and gaseous phases to greatly decrease the productivity of the process. Further, the polymerization reaction proceeds also in the liquid films forming the foams to form a resin in a foamy form resulting in a decrease in the yield of the resin and quality degradation of the resin product. In addition, the resin product produced in such a foam-covered polymerization medium usually contains a large number of so-called fish-eyes which are detrimental to the quality of the resin product.

Various attempts and proposals have of course been made in the prior art to reduce generation of foams or to destroy once generated foams but none of the prior art methods is very effective.

SUMMARY OF THE INVENTION

The present invention accordingly has an object to provide a novel and very efficient means as an improvement in the suspension polymerization of vinyl chloride or a monomer mixture mainly composed of vinyl chloride in an aqueous polymerization medium by which the disadvantages caused by foaming in the aqueous polymerization mixture can be dissolved.

Thus, the present invention provides an improvement, in the process of the suspension polymerization of vinyl chloride monomer or a monomer mixture mainly composed of vinyl chloride in an aqueous polymerization medium by introducing water, a suspending agent, a polymerization initiator and the monomer or monomer mixture into a polymerization reactor equipped with accessory equipement such as a stirrer, reflux condenser and the like to form a polymerization mixture and heating the polymerization mixture under agitation up to a polymerization temperature to start and conduct the polymerization reaction, which comprises: (a) heating at least a part of the surfaces of the polymerization reactor and the accessory equipment to the reactor coming into contact with the gaseous phase above the polymerization mixture in the polymerization reactor to a temperature of 55° C. or higher before the temperature of the polymerization mixture reaches 45° C.; and (b) keeping at least a part of the surfaces of the polymerization reactor and the accessory equipment to the reactor coming into contact with the gaseous phase above the polymerization mixture in the polymerization reactor at a temperature of 55° C. or higher until the moment when conversion of the monomer or monomer mixture into polymer is at least 10% by weight.

BRIEF DESCRIPTION OF THE DRAWING

The FIGURE is a schematic vertical cross sectional view of the polymerization reactor with accessory equipment used in the suspension polymerization according to the invention.

DETAILED DESCRIPTION OF THE PREFERRED EMBODIMENTS

As is described above, the improvement of the invention is characterized by heating and keeping the inner surface of the polymerization reactor and accessory equipment used in the suspension polymerization of vinyl chloride monomer or a monomer mixture thereof coming into contact with the gaseous phase above the polymerization mixture in the reactor at a temperature of 55° C. or higher during the period starting from the moment when the temperature of the polymerization mixture in the reactor has not reached 45° C. in the course of the temperature elevation to the moment when conversion of the monomer or monomer mixture into polymer has reached 10% by weight or more.

The FIGURE in the accompanying drawing schematically illustrates a vertical cross sectional view of a polymerization reactor with accessory equipment used for practicing the invention although the improvement of the invention is applicable regardless of the types of the polymerization reactor. The polymerization reactor illustrated in the FIGURE consists of a body of the vessel 1 which is provided with a jacket 5 to serve as a means for heating and cooling the polymerization mixture in the vessel 1 and the accessory equipment mounted on the upper end plate 4 of the vessel 1 including a stirrer 2 driven by the electric motor 3, reflux condenser 6 and several pipe line nozzles 7, 7, 7 each having a valve 8 at a position nearest to the upper end plate 4 for introducing the respective constituents of the polymerization mixture. The polymerizate slurry after completion of the polymerization reaction is discharged out of the reactor through the discharge valve 9 at the bottom.

As is mentioned before, deionized water as the polymerization medium, suspending agent, polymerization initiator and other additives are introduced into the reactor through the respective pipe line nozzles 7, 7, 7 and, after evacuation of the vessel to exclude the atmospheric air, the vinyl chloride monomer or a monomer mixture mainly composed of vinyl chloride is introduced into the reactor to form a polymerization mixture under agitation. When heating of the polymerization mixture is started by passing hot water or steam through the jacket 5 of the reactor or by other means, it is known that bubbles are formed in the liquid phase to rise therethrough producing foams to cover the liquid surface. It was found that rising of bubbles in the liquid phase leading to formation of foams on the liquid surface is promoted by the condensation of the vinyl chloride monomer vapor on the surface of the reactor and accessory equipment in contact with the gaseous phase above the liquid phase so that the inventors have got an idea that the vigorousness of the rising bubbles could be reduced when the surfaces of the reactor and accessory equipment in contact with the gaseous phase are kept at an elevated temperature.

According to the present invention completed after extensive studies conducted to realize the above mentioned idea, it is necessary that the surfaces of the reactor and the accessory equipment coming into contact with the gaseous phase are heated at a temperature of 55° C. or higher before the temperature of the polymerization mixture has reached 45° C. and this temperature should be kept thereafter until the conversion of the monomer or monomers into polymer has reached at least 10% by weight.

The surfaces of the reactor and the accessory equipment which should be kept at a temperature of 55° C. or higher during the above specified period before and after the start of the polymerization reaction should be as wide as possible including the inner walls of the vessel 1, lower surface of the upper end plate 4, inner surface of the reflux condenser 6 and inner surfaces of the pipe line nozzles 7, 7, 7 below the respective nearest valves 8, 8, 8. Various means can be adaptable for heating these surfaces above the liquid phase. For example, the upper end plate 4 of the reactor can be heated by providing the upper surface thereof with a spiral of a pipe and passing steam therethrough as a so-called steam trace. The pipe line nozzle 7 and the conduit to the reflux condenser 6 can be heated by winding a pipe in a coil therearound and passing steam therethrough. The reflux condenser 6 per se can be heated by passing hot water therethrough in place of a flow of cold water to be passed when the reflux condenser is in operation. Desirably, the surface of the stirrer shaft above the liquid phase should also be heated. This is possible when the stirrer shaft is constructed with a duplex tube for passing hot water or steam. It should be noted, however, that the vertical inner walls of the reactor vessel 1 just above the liquid surface can be heated at the specified temperature only with a great difficulty but the advantages of the inventive improvement can well be obtained even by omitting heating of such a portion of the surfaces. At least, it is important that the surfaces faces of the reflux condenser, each of the pipe line nozzles below the nearest valve and the upper end plate of the reactor should be kept at the specified temperature during the period before and after start of the polymerization reaction. Most importantly, the reflux condenser should be kept at the specified temperature during the period.

The temperature, at which the above described surfaces in contact with the gaseous phase are heated and kept before and after the start of the polymerization, is 55° C. or higher or, preferably, from 60° to 90° C. When the temperature is too low, no full improvement can be obtained in reducing foaming on the liquid surface. Further, heating of these surfaces can be started as early as desired although it is essential that the temperature of the surfaces has reached the specified temperature when the temperature of the polymerization mixture in the reactor under temperature elevation has reached 45° C. Desirably, the surfaces in the gaseous phase should be heated to the specified temperature before the temperature of the polymerization mixture reaches 40° C. When the temperature of the surfaces has not yet reached the specified temperature at the specified moment, no full reduction of foaming can be obtained.

It is essential that the above described surfaces in the gaseous phase are kept thereafter at a temperature of 55° C. or higher until the moment when conversion of the monomer or monomers into polymer has reached 10% by weight or more. When heating of the surfaces is discontinued too early so that the temperature thereof is lower than the specified temperature at the moment of 10% conversion, considerable foaming takes place during the period when the temperature of the surfaces is decreased below the specified temperature. When the temperature of the polymerization mixture is increased to approach the polymerization temperature, it is preferable that the surfaces in the gaseous phase is kept at a temperature higher by at least 2° C. than the temperature of the polymerization mixture at the moment.

As the conversion of the monomer or monomers into polymer exceeds 10% by weight, foaming on the liquid surface is usually subsided so that heating of the surfaces in the gaseous phase is no longer necessary. When the polymerization reaction is in a stage to proceed at a large velocity where the conversion of the monomer or monomers is, for example, 10% to 80%, heating of the surfaces is rather detrimental since the large quantity of the heat of polymerization must be efficiently removed.

Excepting the heating of the surfaces of the polymerization reactor and accessory equipment at the specified temperature during the specified period before and after start of the polymerization reaction, the procedure of polymerization per se can be performed in a conventional manner. When a monomer mixture mainly composed of vinyl chloride is suspension-polymerized according to the improvement of the invention, for example, the comonomer in the monomer mixture, of which at least 50% by weight is vinyl chloride, is exemplified by α-olefins such as ethylene, propylene, 1-butene, 1-pentene, 1-hexene, 1-heptene, 1-octene, 1-nonene, 1-decene, 1-undecene, 1-dodecene, 1-tridecene and 1-tetradecene, acrylic and methacrylic acids and esters thereof such as methyl acrylate, ethyl acrylate and methyl methacrylate, maleic acid and esters thereof, vinyl esters such as vinyl acetate and vinyl propionate, vinyl ethers such as lauryl vinyl ether and isobutyl vinyl ether, maleic anhydride, acrylonitrile, styrene, vinyledene chloride and the like either alone or as a combination of two kinds or more according to need.

The polymerization initiator can also be any of conventional monomer-soluble ones known in the art including percarbonate compounds such as diisopropylperoxy dicarbonate, di-2-ethylhexylperoxy dicarbonate and diethoxyethylperoxy dicarbonate, perester compounds such as tert-butylperoxy neodecanoate, tert-butylperoxy pivalate, tert-hexylperoxy pivalate, α-cumylperoxy neodecanoate and 2,4,4-trimethylpentyl-2-peroxy-2-neodecanoate, organic peroxides such as acetyl cyclohexylsulfonyl peroxide, 2,4,4-trimethylpentyl-2-peroxyphenoxy acetate, 3,5,5-trimethylhexanoyl peroxide and lauroyl peroxide, azo compounds such as azobis-2,4,4-dimethyl valeronitrile and azobis(4-methoxy-2,4-dimethyl valeronitrile, and the like either alone or as a combination of two kinds or more. It is of course optional that these monomer-soluble polymerization initiators are used in combination with a water-soluble initiator such as potassium persulfate, ammonium persulfate, hydrogen peroxide, cumene hydroperoxide and the like. The amount of the polymerization initiator added to the polymerization mixture is in the range from 0.01 to 0.3% by weight based on the monomer or monomer mixture. The polymerization initiator can be introduced into the polymerization mixture either directly as such or in the form of an aqueous emulsion prepared in advance by using an emulsifying agent.

The suspending agent used for making a suspension of the monomer or monomer mixture in the aqueous medium can also be any of conventional ones including water-soluble cellulose ethers such as methyl cellulose, ethyl cellulose, hydroxyethyl cellulose, hydroxypropyl cellulose and hydroxypropyl methyl cellulose, water-soluble or monomer-soluble partially saponified polyvinyl alcohols, polymers of acrylic acid, water-soluble natural polymers such as gelatin, monomer-soluble surface active agents such as sorbitan monolaurate, sorbitan trioleate, sorbitan monostearate, glycerin tristearate and block copolymers of ethylene oxide and propylene oxide, water-soluble surface active agents such as polyoxyethylene sorbitan monolaurate, polyoxyethylene glycerin oleate, sodium laurate and sodium dodecylbenzene sulfonate, certain inorganic powders such as calcium carbonate and calcium phosphate and so on either alone or as a combination of two kinds or more according to need. The amount of the suspending agent added to the polymerization mixture is in the range from 0.02 to 0.5% by weight based on the monomer or monomer mixture. It should be noted, however, that the improvement of the invention is particularly remarkable when the suspending agent is a water-soluble partially saponified polyvinyl alcohol having an average degree of polymerization of at least 700 and a degree of saponification of at least 70% used in an amount of at least 0.03% by weight based on the monomer or monomer mixture. These suspending agents are introduced into the polymerization mixture either directly as such or in the form of an aqueous solution prepared in advance. The suspending agent can be introduced into the polymerization reaction before, during or after introduction of the monomer or monomer mixture into the reactor.

The deionized water to serve as the medium of the polymerization mixture is introduced into the reactor usually at a temperature of 20° to 50° C. When the water as introduced into the reactor is too cold, productivity of the process would be unduly decreased due to the so long time taken for increasing the temperature of the polymerization mixture up to the polymerization temperature. When the water is too hot, on the other hand, the polymerization reaction would be started even before uniformity and stability of the monomer suspension can be established resulting in non-uniformity of the polymeric resin and an increased amount of fisheyes. Incidentally, the temperature of the polymerization mixture is lower than 45° C. after completion of introduction of the monomer or monomer mixture even when the deionized water is introduced at a temperature of 50° C. because the monomer or monomer mixture is introduced into the reactor at a much lower temperature.

It is optional according to need that the polymerization mixture is admixed with various kinds of additives known and used in the art of the suspension polymerization of vinyl chloride including polymerization moderators, chain transfer agents, pH-controlling agents, gelation improvers, antistatic agents, crosslinking agents, stabilizers, fillers, antioxidants, buffering agents, scale-deposition inhibitors and the like each in a limited amount.

In the following, the improvement obtained according to the invention is described in more detail by way of examples which, however, should never be construed to limit the scope of the invention in any way.

EXAMPLE 1

In a jacketed polymerization reactor of 2000 liter capacity made of stainless steel having a structure as illustrated in the FIGURE of the accompanying drawing equipped with a stirrer and a reflux condenser having a heat-transfer surface area of 4.5 m², the reflux condenser was heated at 70° C. by passing hot water therethrough, each of the pipe line nozzles below the nearest valve was heated at 70° C. by passing steam through the coil of a pipe wound therearound and the upper end plate was heated at 60° C. by passing steam through the spiral pipe line provided thereon.

In the next place, 980 kg of deionized water at 35° C., 382 g of a water-soluble partially saponified polyvinyl alcohol having an average degree of polymerization of 2550 and a degree of saponification of 80% and 143 g of a water-soluble methyl cellulose were introduced into the reactor which was then evacuated followed by introduction of 700 kg of vinyl chloride monomer. While the mixture in the reactor was under agitation, 280 g of di-2-ethylhexylperoxy dicarbonate were introduced by pumping into the reactor by using a high-pressure pump. Concurrently with introduction of the polymerization initiator, heating of the polymerization mixture was started to increase the temperature up to the polymerization temperature of 58° C. and the polymerization reaction was continued at this temperature until the pressure inside the reactor had dropped to 6.0 kg/cm². Each of the surfaces coming into contact with the gaseous phase above the polymerization mixture was kept at the above mentioned temperature until the moment when conversion of the vinyl chloride monomer into polymer was 10% as determined from the conversion vs. polymerization time curve of a graph prepared beforehand.

Starting from the moment of the above mentioned 10% monomer conversion, the temperature of the reflux condenser was gradually decreased down to 52° C. At the moment of the 10% monomer conversion, passing of steam through the pipe lines was discontinued so as to allow the pipe line nozzles and the upper end plate of the reactor to be cooled spontaneously. The temperature of these parts at the end of the polymerization reaction was 58° C.

After termination of the polymerization reaction, the unreacted vinyl chloride monomer was recovered and the polymerizate slurry was discharged out of the reactor. Thereafter, the inner walls of the reactor were washed with water and the surface was visually inspected to find deposition of polymer scale thereon, if any. Absolutely no scale deposition was found on any part of the inner surfaces including not only the area in contact with the liquid phase of the polymerization mixture during the polymerization reaction but also the areas in contact with the gaseous phase and at the boundary between phases dur-ing the reaction.

The polymerizate slurry discharged out of the polymerization reactor was processed in a conventional manner to give a polyvinyl chloride resin powder after dehydration and drying. The thus obtained resin powder was subjected to the measurements of the amount of the foamy resin and occurrence of fish-eyes. The amount of the foamy resin was measured by screening the resin powder using a screen of 48 mesh fineness of the openings as specified in JIS Z 8801 to record the amount of the resin retained on the screen. The amount of foamy resin was zero in this case. The occurrence of fish-eyes was estimated in the following procedure.

Thus, 100 parts by weight of the resin powder were compounded with 50 parts by weight of dioctyl phthalate, 0.5 part by weight of tribasic lead sulfate, 1.5 parts by weight of lead stearate, 0.1 part of titanium dioxide and 0.05 part by weight of carbon black and a 25 g portion of the compound was kneaded for 5 minutes on a 6-inch testing roller mill at 140° C. followed by sheeting of the kneaded compound into a sheet having a width of 15 mm and a thickness of 0.2 mm, of which the number of transparent particles was counted on a 100 cm$^2$ area to record the number as the abundance of fish-eyes, which was zero in this case.

EXAMPLE 2

The experimental procedure was substantially the same as in Example 1 described above except that the temperatures of the reflux condenser, each of the pipe line nozzles and upper end plate of the reactor before temperature elevation of the polymerization mixture were 60° C., 60° C. and 55° C., respectively, instead of 70° C., 70° C. and 60° C., respectively, The results were that, although the inner surfaces of the reactor were absolutely free from deposition of polymer scale in the areas in contact with the liquid and gaseous phases, a slight cloudiness was found on the areas at the interface between the liquid and gaseous phases. The amount of foamy resin was 0.1% by weight but absolutely no fish-eyes could be detected.

EXAMPLE 3

The experimental procedure was substantially the same as in Example 1 described above including the schedule for the temperature control of the reflux condenser except that the temperature of each of the pipe line nozzles and the upper end plate of the reactor was 30° C. without using the steam pipe before start of the temperature elevation of the polymerization mixture and was allowed to be as it went increasing to 58° C. at the end of the polymerization reaction.

The results were that, although the inner surfaces of the reactor were absolutely free from deposition of polymer scale in the areas in contact with the liquid and gaseous phases, polymer scale deposition was clearly found in the areas at the interface between the liquid and gaseous phases. Absolutely no foamy resin was detected but the number of fish-eyes was 8 per 100 cm$^2$.

EXAMPLE 4

The experimental procedure was substantially the same as in Example 2 described above excepting the schedules of the temperature control of the various parts. Thus, the reflux condenser was heated at 60° C. before the start of the polymerization reaction and then kept at 55° C. until the moment when the monomer conversion was 6% and then decreased to 52° C. before the monomer conversion reached 10% to maintain this temperature thereafter. Each of the pipe line nozzles was kept at 60° C. until the moment when the monomer conversion was 6% followed by termination of steam supply through the steam trace to allow the temperature as it went reaching 58° C. at the end of the polymerization reaction. The upper end plate of the reactor was kept at 55° C. until the moment when the monomer conversion was 6% followed by termination of steam supply through the steam trace to allow the temperature as it went reaching 58° C. at the end of the polymerization reaction.

The results were that, although the inner surfaces of the reactor were absolutely free from deposition of polymer scale in the areas in contact with the liquid and gaseous phases, a small amount of polymer scale deposition was found in the areas at the interface between the liquid and gaseous phases. The amount of foamy resin was 0.6% by weight but the number of fish-eyes was 4 per 100 cm$^2$.

EXAMPLE 5

The experimental procedure was substantially the same as in Example 2 described above including the schedules for the temperature control of each of the pipe line nozzles and the upper end plate of the reactor excepting the schedule for the temperature control of the reflux condenser which was kept at 30° C. by holding water at this temperature therein before the start of the polymerization reaction and the temperature of the water in the reflux condenser was gradually increased to 40° C. at the moment when the monomer conversion was 10% followed by passing of water so as to keep the temperature of the reflux condenser not to exceed 52° C.

The results were that, although the inner surfaces of the reactor were free from deposition of polymer scale in the areas in contact with the liquid phase of the polymerization mixture, polymer scale deposition was found in the areas all around the interface between the liquid and on some areas in contact with the gaseous phase. The amount of foamy resin was 2.1% but the number of fish-eyes was 15 per 100 cm$^2$.

What is claimed is:

1. In a process of suspension polymerization of vinyl chloride monomer or a monomer mixture mainly composed of vinyl chloride in an aqueous polymerization medium by introducing water, a suspending agent, a polymerization initiator and the monomer or monomer mixture into a polymerization reactor with accessory equipment to form a polymerization mixture and heating the polymerization mixture under agitation up to a polymerization temperature to start and conduct the polymerization reaction, an improvement which comprises:

(a) heating at least a part of the surfaces of the polymerization reactor and the accessory equipment to the reactor coming into contact with the gaseous phase above the polymerization mixture in the polymerization reactor to an elevated temperature of 55° C. or higher before the temperature of the polymerization mixture reaches 45° C.; and (b) keeping at least a part of the surfaces of the polymerization reactor and the accessory equipment to the reactor coming into contact with the gaseous phase above the polymerization mixture in the polymerization reactor at an elevated temperature of 55° C. or higher until a moment when conversion of the monomer or monomer mixture into polymer is at least 10% by weight; wherein the elevated temperature in steps (a) and (b) is higher by at least 2° C. than the temperature of the polymerization mixture in the polymerization reactor.

2. The improvement as claimed in claim 1 in which the elevated temperature in steps (a) and (b) is in the range from 60° C. to 90° C.

* * * * *